US005710915A

United States Patent [19]
McElhiney

[11] Patent Number: 5,710,915
[45] Date of Patent: Jan. 20, 1998

[54] METHOD FOR ACCELERATING ACCESS TO A DATABASE CLUSTERED PARTITIONING

[75] Inventor: James David McElhiney, Ottawa, Canada

[73] Assignee: Electronic Data Systems Corporation, Plano, Tex.

[21] Appl. No.: 576,102

[22] Filed: Dec. 21, 1995

[51] Int. Cl.⁶ ............................................. G06F 17/30
[52] U.S. Cl. ...................... 395/603; 395/604; 395/605; 395/606; 395/235; 395/621
[58] Field of Search ............................... 395/602–606

[56] References Cited

U.S. PATENT DOCUMENTS

| 5,495,608 | 2/1996 | Antoshenkov | 395/603 |
| 5,649,181 | 7/1997 | French et al. | 395/603 |

OTHER PUBLICATIONS

"Practical Spatial Database Access Methods", Betty Salzberg, IEEE, Applied Computing Symposium, Jan. 1991.
"Gray Codes for Partial Match and Range Queries", Christos Faloutsos, IEEE Transactions on Software Engineering, vol. 14, No. 10, Oct. 1988.
Lomet, David B. and Salzberg, Betty, "The hB–Tree: A Multiattribute Indexing Method with Good Guaranteed Performance", *ACM Transactions on Database Systems*, vol. 15, No.4, Dec. 1990, pp. 625–658.
Laurini, Robert and Thompson, Derek, *Fundamentals of Spatial Information Systems*, Academic Press, London, 1992, Section 4.7.2, pp. 162–167.

*Primary Examiner*—Thomas G. Black
*Assistant Examiner*—Hosain T. Alam
*Attorney, Agent, or Firm*—L. Joy Griebenow

[57] ABSTRACT

A database organization system that separates fields used for record selection into a search table, leaving fields used solely for retrieval in a separate detail table. The system constructs a bit-interleaved key field within the search table, causing records with similar field values to cluster. The system further partitions the tables into multiple pairs of sub-tables as size increases, and builds a statistics table with information describing each partitioned sub-table. Each sub-table is searched separately and the results merged. The bits of the bit-interleaved key are ordered by likelihood of data query, and the partitioning is performed using the value of each bit. The system keeps statistics for each partition, and allows parallel searching of each partition. Query speed is enhanced by culling sub-tables from the search process, by reading only the search table data, and by eliminating record-level tests on tables completely within the desired result set.

19 Claims, 6 Drawing Sheets

METHOD FOR ACCELERATING ACCESS TO A DATABASE CLUSTERED PARTITIONING

FIELD OF THE INVENTION

This invention relates to computer systems and more particularly to database management systems within such computer systems. Even more particularly, the invention relates to a method for accelerating accessing of records in a database by clustered partitioning of data records based on multiple fields of interest.

BACKGROUND OF THE INVENTION

In databases, particularly very large databases, performance can be considerably improved if records being accessed are grouped together. If the records are grouped together, the disk heads will have to seek less, thus saving time when the next record is accessed. More importantly, in search methods requiring scanning of the individual data records, the ability to constrain the range of the brute force scan can reduce the workload manyfold. The problem can be summarized as one of efficient orthogonal range searching. Consider a large data base consisting of a very large number, perhaps millions or billions, of similar records, for example measurement or sales records. Typically, there are multiple values associated with each record which may be used as criteria to create subsets of the records, or for obtaining statistics on subsets of the records, such as aggregations, counts, extrema, deviations etc. Since these values are independent variables, they are known as orthogonal. Since each constraint is assumed to be represented as a range, and most often a range of values, the problem is generally known as orthogonal range searching. Often the number of fields which may be used as criteria to create subsets, known as fields of interest, number more than one, and perhaps as high as 12 to 20.

All indexes available in prior art relational database management systems order records into 0 (hash) or 1 (tree) ordering. Therefore, although it is possible to construct multiple indices on a table, it is not possible to construct an indexing system which:

can use range constraints on more than one field, perhaps as many as 10 or 20, to determine which records in a database to read; and can provide a "tight" constraint when so used: that is, the number of candidate records needing inspection for validation against the criteria should be a very small multiple of the number of records satisfying all of the criteria, for example between 1 and 4.

Indexing methods relating to orthogonal range searching are common in the literature. For example, the basic bit interleaving technique is well described as space-filling curve index, in "Fundamentals of Spatial Information Systems" by Laurini and Thompson, Academic Press, 1992, Section 4.7.2, pp 162–167. Other techniques, generally tree-based in nature, include kd-trees, K_D_B trees, and hB Trees. "A Multiattribute Indexing Method with Good Guaranteed Performance", David B. Lomet and Betty Salzberg, *ACM Transactions on Database Systems*, Volume 15, Number 4, December 1990, p 625, includes a brief review of all these techniques. Bit interleaving and the various multidimensional trees represent the two general classes of multivariate indexing techniques, each with known disadvantages:

1. Bit interleaving is an example of a simple ordering of multiple semi-continuous variables into a numerical value which can then be ordered using a standard B-tree style index. Performance is poor, but applications are general. Applications to samples which span a range are difficult, though this is not an issue in the current problem.

2. Sophisticated tree indexing techniques, typified by the hB Tree technique, are better performing, but are not easily applied to existing, commercial database systems without access to the kernel of the database engine, and the ability to create and maintain new classes of index structures. Applications to samples which span a range are straight forward. Deletions from some tree-style indexes are very involved, and so applications are sometimes limited to non-dynamic data sets.

Several individual parts of the process are well known techniques in common practice in the industry. Bit interleaving as a multidimensional indexing basis is well described in the literature, as mentioned above. As well, partitioning of data along grid file lines is a common technique to achieve parallelization, and has been used before to accomplish coarse-grained multidimensional indexing.

It is thus apparent that there is a need in the art for a method that can use more than one field constraint to cluster records within a database. The present invention meets this and other needs in the art.

SUMMARY OF THE INVENTION

It is an aspect of the invention to store data records in a data base in a manner that will optimize searching for records.

It is another aspect of the invention first to store the records in two tables, a search table to be used for searching, and a detail data table for containing the data, wherein the records of the two tables are joined by a common key field.

Another aspect of the invention is to divide the search table into a plurality of pairs of search and detail sub-tables, each pair having a defined maximum quantity of records.

Yet another aspect is to create a statistics table to provide statistics for each of the pairs of sub-tables.

A further aspect of the invention is to form an interleaved bit key for each record, wherein the bits of the fields to be searched are interleaved into the key to cause records having similar values in the fields to cluster.

The above and other aspects of the invention are accomplished in a technique of unifying all of the data being analyzed into a single large detail table within a database; identifying and selecting the fields or values which are of interest for analytical purposes; extracting these fields into a search table; bit interleaving the fields within the search table, which causes the records in the search and detail tables to cluster records with similar data in the search fields; partitioning the search table into multiple pairs of sub-tables as the search table size increases; creating and maintaining statistical information describing this partitioning process in a statistics table; decomposing all constrained statistical queries in such a way as to ensure that no component set of records is considered which is known a priori, not to intersect with the solution set; and merging the results from the queries of each partitioned data set.

By decomposing many millions of records into many separate clustered search sub-tables, significant performance increases can be realized without using additional hardware or non-standard database software.

The system also can be implemented using a standard, commercial relational database engine. The system splits the data sub-tables one bit at a time, allowing smooth and adaptive introduction of new tables. It orders the dimension bits arbitrarily, based on likelihood of data query. It keeps, in a statistics table, extended statistics of the minimum and maximum values of each field value, and it allows loosely coupled parallelization on multiple platforms, since each sub-table can be separately searched.

BRIEF DESCRIPTION OF THE DRAWINGS

The above and other aspects, features, and advantages of the invention will be better understood by reading the following more particular description of the invention, presented in conjunction with the following drawings, wherein.

DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

The present invention is based on the idea of multidimensional indexing within a relational database, it does not use any data structures external to the RDBMS, and it does not fundamentally rely on any pre-computed aggregates, though those skilled in the art could easily add aggregates to the scheme without changing its character.

The following terms are used in this specification:

Input table—a single, large, denormalized table containing all of the data to be searched. It will be partitioned into multiple physical tables during storage.

Search table—a table constructed from the input table containing only those fields that are deemed to be valid constraints for searching purposes. Sometimes called a "horizontal" subset of the input table. These rows have the same primary key as, and have a one-to-one relationship with, the detail table. Typically these fields are numeric or coded fields.

Detail table—a table constructed from the input table containing only those fields that are known not to be used as constraints for searching purposes. Sometimes called a "horizontal" subset of the input table. These rows have the same primary key as, and have a one-to-one relationship with, the search table. Typically these fields are textual fields, such as descriptions.

Bit-interleave key—a key value constructed from the values of the search fields in a given search table.

Partition—a search table and a detail table, all of whose records share the same values for the most significant bits of the bit-interleave key of the search table. All records in a partition typically have similar values for all search fields. Sometimes called a "vertical" subset of the input table.

Statistics table—a separate table, not visible outside the search system, used for bookkeeping involved in creating and searching partitions from an input table.

Figure 1:
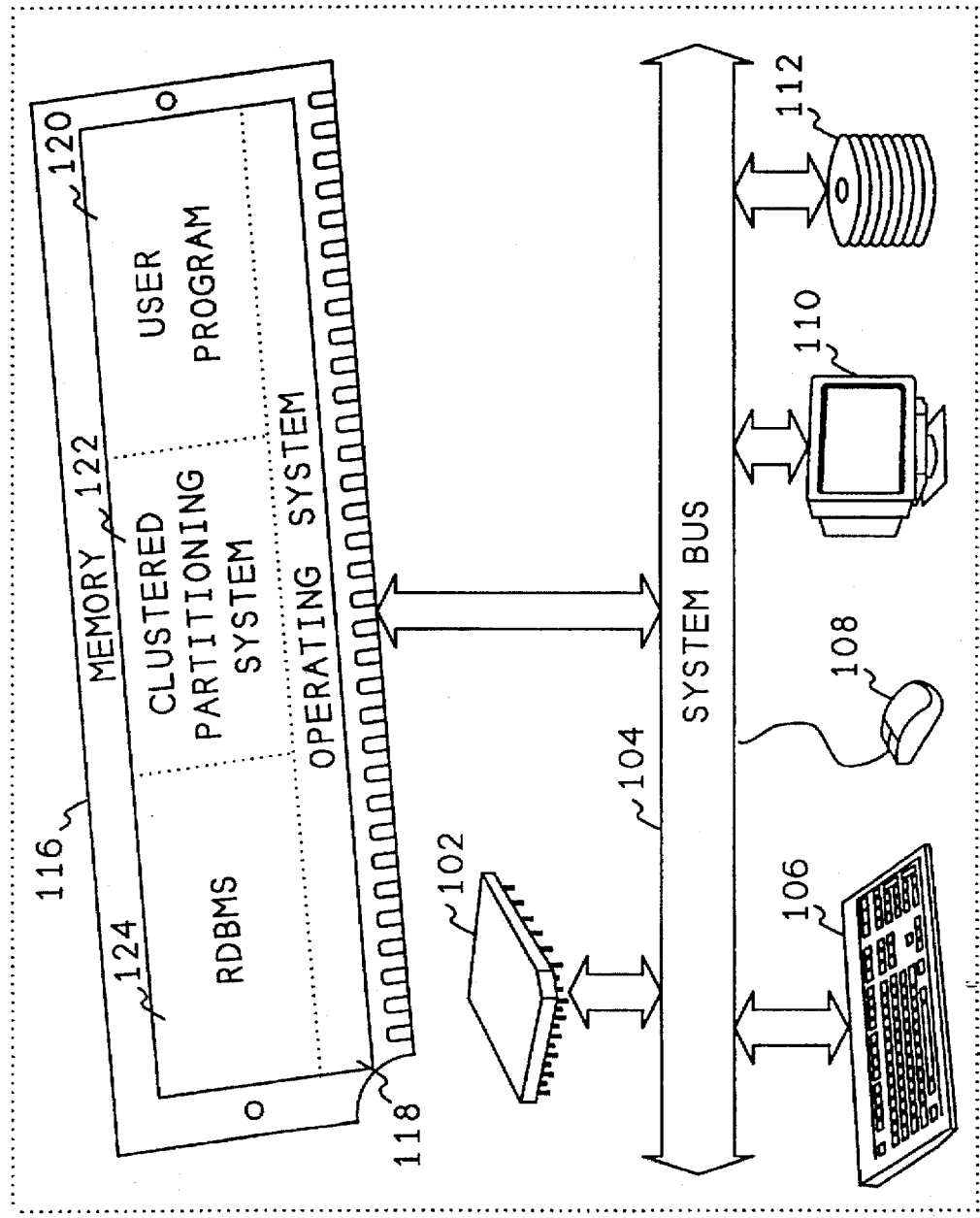
FIG. 1 shows a block diagram of a computer system incorporating the present invention.

FIG. 1 shows a block diagram of a computer system incorporating the present invention. Referring now to FIG. 1, a computer system 100 contains a processing element 102 which communicates to other elements of the computer system 100 over a system bus 104. A keyboard 106 and a mouse 108 provide input to the computer system 100 and a display 110 allows software within the computer system 100 to output information to a user of the system. A disk 112 stores the software and database data of the present invention. A memory 116 within the computer system 100 contains an operating system 118 as well as a user program 120, the clustered partitioning system of the present invention, and a relational database management system 124.

The present invention will be explained using the context of a client-account management database, which is used for database marketing purposes. The technique is general, however, and can be applied to a number of subject areas which have similar large databases used for decision support.

The first step is to define a database structure for a detail data table that will contain all the data. One possible model for the structure is a star data schema ("dimensional data model"), as described in "Why Decision Support Fails and How to Fix It", by Ralph Kimbal and Kevin Strehlo, Datamation magazine, Jun. 1, 1994, pages 40–43. For this example, tables for client, household, contact, and address are denormalized into a single wide table called an input data table. Additionally, orders, products, markets, and promotions could be added to the input data table.

After the structure is defined, the input data table is split into two tables. The first table is called the search table, and it contains only that information which will be used for searches. All remaining fields are placed into another table, known as the detail data table. The detail table fields are used only for selection into output lists, never for use in selection constraints, e.g. "WHERE" clauses, or for aggregation functions.

All information in the search table should be packed as tightly as possible. For example, fields should be encoded as single character or short integer values where possible, in order to minimize the size on disk.

Wherever possible, reduce the data to categories: income range numbers, age range numbers, education level codes, etc., in order to minimize the number of bits needed to represent the cardinality of each field.

If possible, split coded fields. For example, a coded field such as promotion type having the values:

0=no promotion

1=TV coverage 93/12

2=direct mailing 94/5

3=direct mailing 95/7

4=telemarketing contact

Would be replaced with orthogonal fields:

Field 1: did you promote by TV?

Field 2: TV promotion number

Field 3: did you telemarket?

Field 4: telemarketing contact date category

Field 5: number of direct mail targetings in 1993

A serial key field is added to both the search table and the detail data table. After defining the bit-interleave key (see FIG. 3 and description below), the search table definition can be completed, since there is no need to store any fields in the search table whose values are exactly defined by bits in the bit-interleave key. The search table is then constructed from:

The unique row number

The bit-interleave key value

All searchable fields that are not completely defined in the bit-interleave key

There is no need for a database index on any of these fields, although indices may be added without changing the character of the method. The search table is the same length as the detail data table, but it will only contain the fields which will be searched. Fields such as full name, addresses, telephone numbers, comments, etc. remain only in the detail data table, which is tied to the search table through the same serial key. The detail data table has one index, the serial key.

Figure 2:
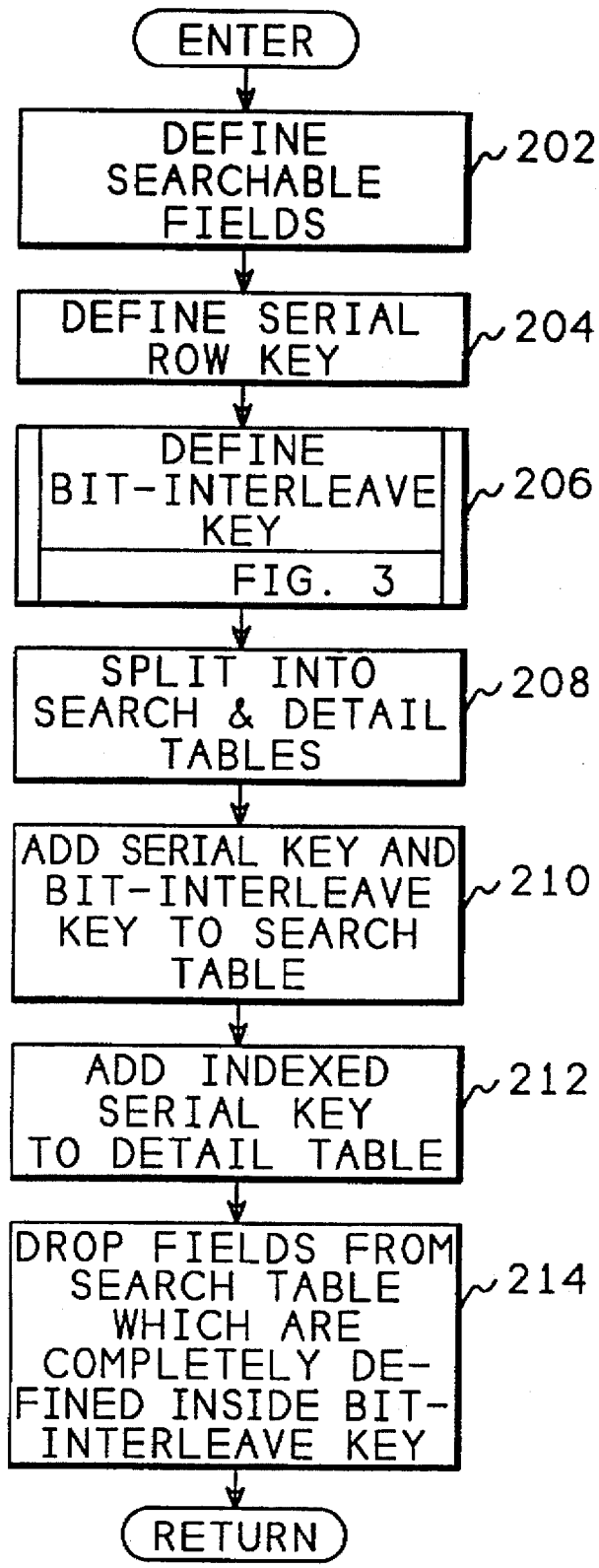
FIG. 2 shows a flowchart of the process of creating a database using the present invention.

FIG. 2 shows a flowchart of the process of creating a database using the present invention. Referring now to FIG. 2, after entry, block 202 designates a subset of the fields as searchable, and the remainder of the fields as non-searchable. As described above, the detail table contains all of the information that is read-only (i.e. not searched) within the input table, and the search table contains the fields which may also be used for selection criteria or aggregation functions. Thus, the present invention splits a database table into two tables, on containing the retrieve-only data, and one containing the remaining fields which can be used for selecting or retrieval.

After creating the search table, block 204 defines a unique key value for each row. This value may be any arbitrary unique value, but the simplest implementation is the use of a serially assigned value starting at 1.

Figure 3:
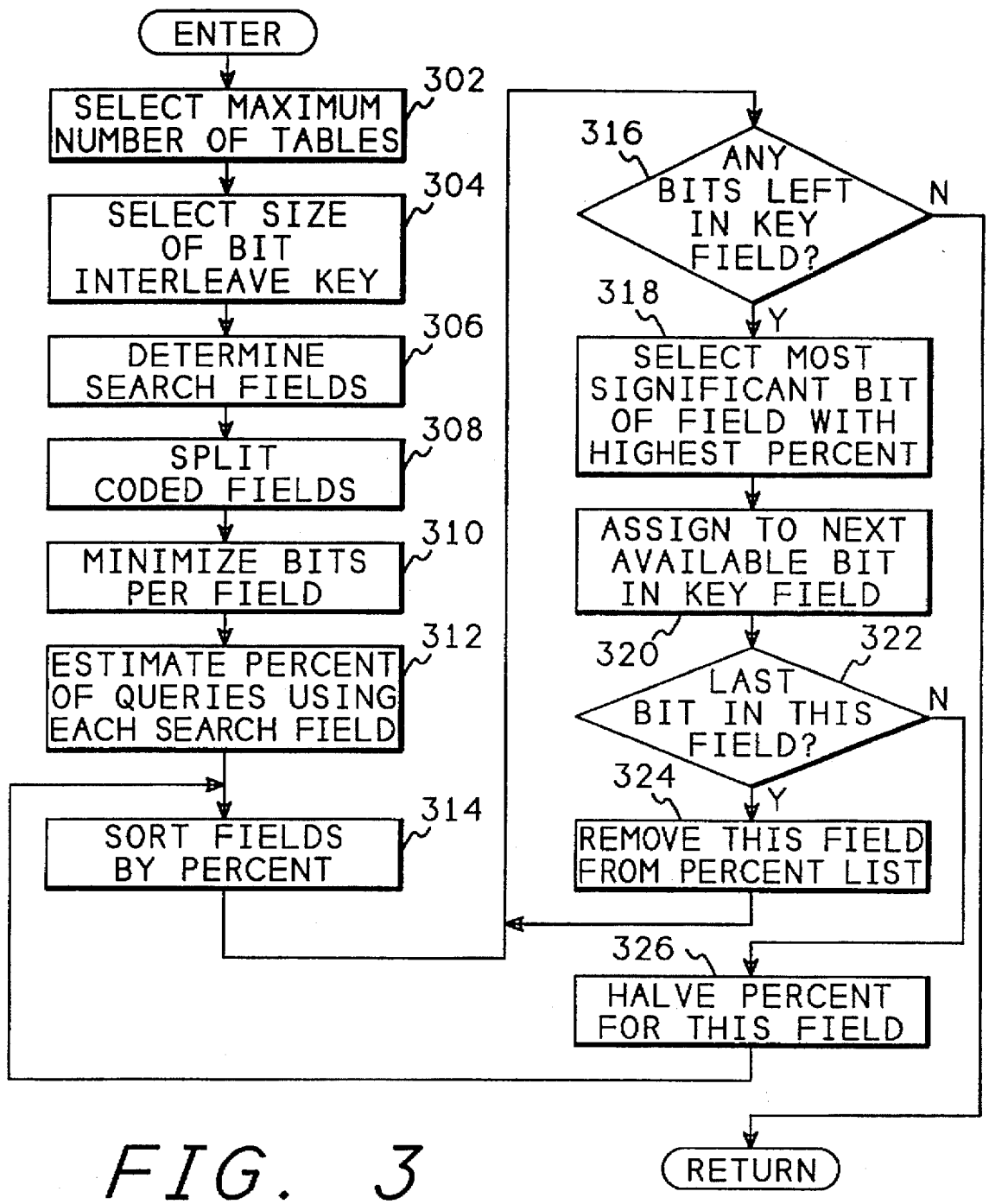
FIG. 3 shows a flowchart of the add bit interleaved key field called from FIG. 2.

Block 206 calls FIG. 3 to create the bit-interleave key value for the search table.

Block 208 creates two tables, search and detail, from the input table. All searchable fields are placed in the search table, and the remainder of the fields are placed in the detail table.

Block 210 shows the addition of the serial key and the bit-interleave key to the search table.

Block 212 shows the addition of the serial key to the detail table. This field should be an indexed field within the RDBMS. Since this value exists in both sub-tables, the records can be joined together later using the matching key values. There will always be a one to one relationship between the records in the search table and those in the detail table. Data will be looked up in the search table, and then the serial key obtained and used to access the data within the detail table.

Block 214 shows the removal of searchable fields from the search table which are completely contained within the bit-interleaved key value, since these values can be reconstructed from the key later. For example, if the field "sex_of_customer", a 2-valued field, is contained within the bit-interleaved key, there is no need for a separate "sex_of_customer" field, since the value can be obtained by examining the appropriate bit within the bit-interleave key value.

The bit interleaved key field is constructed by defining all searchable dimensions (fields), reducing the cardinality of each field to as few bits as possible, even if the result in an odd number of bits, and building a composite key, starting from the most significant bit and continuing to the least significant bit.

FIG. 3 shows a flowchart of the process of creating the bit interleaved key value, as called from block 206 of FIG. 2. Referring now to FIG. 3, after entry, block 302 selects the maximum number of tables to be used for partitioning, based on the maximum number that the RDBMS can manage without performance penalty. For example, 4000.

Block 304 then selects the size in bits of the composite bit-interleaved key field. This should be at least 50% more than the minimum number of bits necessary to enumerate the maximum number of tables to be used. The preferred embodiment uses 32 bits. Block 306 determines the searchable query fields. Block 308 splits coded fields into orthogonal sets as necessary where queries may be done on subsets of the query field's codes. For example, one might split a promotion number field into promotion month and promotion type.

Block 310 reduces each query field to a minimum number of bits necessary to hold the information.

Block 312 estimates and stores a percentage of queries expected to use this query field in a "WHERE" clause as a constraint on the found set. For example the fields might be estimated as:

| Time period field | 55% of queries |
| Location code | 45% of queries |
| Purchase amount $ | 40% of queries |
| Promotion number | 30% of queries |
| Number of purchases | 25% of queries |
| Sex of customer | 18% of queries |
| Age of customer | 5% of queries |
| Income of customer | 5% of queries |

This estimate would typically be provided by the designer of the system, or, alternatively, the percentages can be determined automatically for existing databases by examining a record of the existing queries being used and counting the number of existing queries that have used each field.

Block 314 sorts all query fields based on the stored percentages, and block 316 determines if any bits remain unassigned in the key field. If not, FIG. 3 returns to its caller. If there are remaining unassigned bits, block 316 goes to block 318 which selects the most significant remaining bit from the query field with the highest stored estimate of queries using that field. Block 320 places the bit from the query field in the next most significant remaining bit in the key field.

Block 322 determines if this is the last bit in this field, and if so, goes to block 324. If not, block 322 goes to block 326. Block 324 removes this field from the list of estimated percentages, and goes to block 316. Block 326 reduces the estimate of the fraction of queries that will use this query field, and then continues with block 314 to find a new highest value. In the preferred embodiment, this reduction is by half.

Although this process may require careful planning to be optimal, based on the ability to estimate the fraction of queries that will use each searchable field, the planning does not have to be perfect. Ideally the system should have at least one bit of each likely search field in the first 12 to 16 bits of the bit interleave key field. In a marketing database example, the following would typically be included somewhere in the first bits:

1 bit of age category 1 bit of income category 1 bit of education category 1 bit of sex 1 bit of purchase count 1 bit of purchase dollars 1 bit of product category 3 or 4 bits of geography
  scheme 1: top bits of zip code (17 bits total)
  scheme 2: north/south, east/west, border/non-coast state, coast/non-coast state.
  scheme 3: north/south, east/west, urban/ex-urban
  scheme 4: top bit of latitude, top bit of longitude, next bit of lat, next bit of long.
1 or 2 bits of promotions
  promoted mass media/not promoted mass media
  promoted direct/not promoted direct
3 or 4 bits of time
  top bits of week number Although the list above is an example of the list of bits to use; they would not be in this order. One possible ordering might be:

Most Significant Bit (MSB) time
MSB geography
MSB purchase dollars
MSB promotions
2nd MSB time
MSB purchase count
2nd MSB geography
sex bit
3rd MSB time
2nd MSB promotions
3rd MSB geography
MSB age
MSB income
4th MSB time
MSB education category
5th MSB time
2nd MSB purchase count
4th MSB geography etc.

When this key is inserted, it is stored as a string, for example "01100101001010101 . . . ". This will allow for table scanning using a pattern match command.

For use with relational databases that support bit-level operators, this can be stored more compactly as an integer, for example, consider the case of a 10-bit interleaved key. A typical row might have a value like 1000001010. This might be stored in Oracle as the string "1000001010", and queried using the LIKE operator. However, in Sybase, it might be stored as the integer 1034, and queried using the "&" (bitwise AND) operator.

After building the database structure, records are added to the search and detail tables of the database. As records are inserted, the system tests to determine if the number of records exceeds a predetermined threshold number, for example 50,000 records. When this threshold is exceeded, both the search and detail tables are partitioned, i.e. split into two sub-tables each. This threshold is tunable, based upon the size of the database and the size and number of disks in the computer system. When possible, the two sub-tables are placed on separate physical storage devices.

Each of the two tables making up the partition, the search table and the detail table, is partitioned upon the most significant common bit that varies among members of the table or sub-table. In the example above, the first partition would separate each table into the oldest half of the data versus the newest half, since the highest order bit represents time. When the partition is split, an entry for each of the two sub-partitions is added to a single central statistics table. This entry comprises:

Partition number (serial)
Search sub-table name
Detail sub-table name
Minimum bit-interleave key possible in this partition
Maximum bit-interleave key possible in this partition
Count of records in the partition
For each searchable field:
  Minimum value of the field in the partition
  Maximum value of the field in the partition
  For numeric fields, sum of the values in the field Further, the individual sub-tables may be placed on different computer systems. Thus, the system can easily be parallelized on a farm of single processor machines. Indeed, this ability to provide coarse-grain parallelization is one of the strengths of this technique, since there is no additional implementation work necessary to place the sub-tables on separate computer systems, when using any relational database which allows a task to have simultaneous connections to databases on separate machines.

Triggers are available in some relational database management systems, and these triggers will call a subroutine whenever a database record is changed, inserted or deleted. These triggers can be used to keep the statistics table up to date. Alternatively, specialized code in the program doing the load task can keep the statistics tables up to date.

Figure 4:
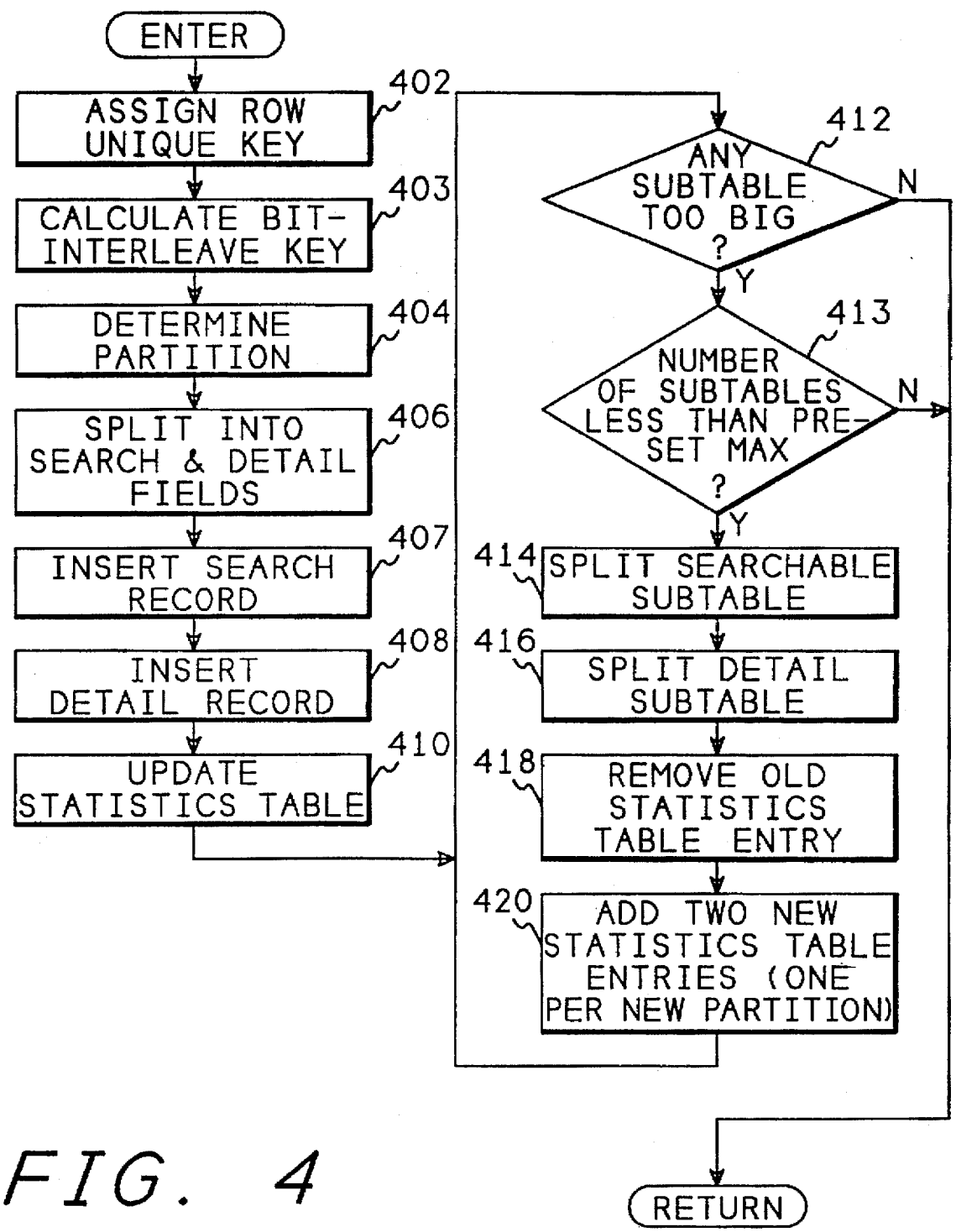
FIG. 4 shows a flowchart of the add record process of the present invention.

FIG. 4 shows a flowchart of the process for adding a record to the database that was constructed using FIGS. 2 and 3 above. Referring now to FIG. 4, after entry, block 402 assigns each row an arbitrary unique row number, for use as a primary key. The method of selection is not critical; monotonically increasing integers will suffice.

Block 403 calculates the bit-interleaved partitioning key as described in FIG. 3. The contents and organization of this key was defined in FIG. 3, above. This key is not necessarily a unique value.

Block 404 uses the result of block 403 to search the statistics table, in order to determine which of the existing partitions should contain the new record being inserted. Note that each entry in this statistics table specifies a pair of tables: one search table, and one detail table, with a one to one correspondence.

Block 406 splits the record into two records. The first section, or first row, for insertion into the search table, includes all of the fields deemed searchable as a result of the process described in block 202, plus the unique row number selected in block 402, plus the bit-interleave key determined in block 403. The second section, or second row, for insertion into the detail table, includes all of the remaining fields, plus the unique row number from block 402.

Block 407 shows the insertion of the first row into the appropriate search table which was selected in block 404. Block 408 shows the insertion of the non-searchable second row into the appropriate detail table which was selected in block 404.

Block 410 updates the statistics table. This is the row of the statistics table which was found in block 404. The update will alter the count of records for the partition being described by the row, and may alter the minimum, maximum, and/or sum that is recorded for each searchable field.

At this point the decision block 412 tests to determine if this partition has a number of rows larger than the threshold set for partition size, which may be measured in rows or in bytes. As discussed above, each partition comprises a single descriptive record in the statistics table, a search table, and a detail table. Also as discussed above, when the size of the search table exceeds a predetermined value, the search table and detail table for the partition are each split into sub-tables, replacing one partition with two smaller ones. When one of these new partitions exceeds this same threshold, it is split again. Each time a new partition is created by splitting its search and detail tables, a new entry is created in the statistics table.

The size of each partition is tunable for each particular database. That is, it might be 50,000 records for some databases, or a total of 10 megabytes for other databases, or whatever number achieves an optimal result. Also, each sub-table, where possible, should be stored on a different physical data storage device. This improves searching since there is no contention amongst the different data devices. Further, since each sub-table is independent, each sub-table can be searched independently by a different parallel process, where parallel processing is available.

If there is a partition that is too big, execution continues with block 413. If not, processing is complete.

Block 413 determines if the number of partitions is less than the maximum number selected in block 302. If the threshold has been met, processing is complete, as no further partition splits can take place. Otherwise, control is passed to block 414 to split the table.

The processing starting at block 414 involves two physical splits: block 414 splits the search table for the partition, and block 416 splits the detail data table for the partition. At this point the statistics table is updated: first the old statistics table record is removed at block 418, then it is replaced with two new records as shown in block 420. Block 420 requires the calculation of the new counts, maxima, and minima for the searchable table: these can be accumulated during a single scan of the searchable table while determining which records go into which of the two new tables.

Execution then returns to block 412, to ensure that no other partition within the database needs splitting. If so, it is split according to the process of blocks 414 through 420. If not, processing terminates.

Figure 5:
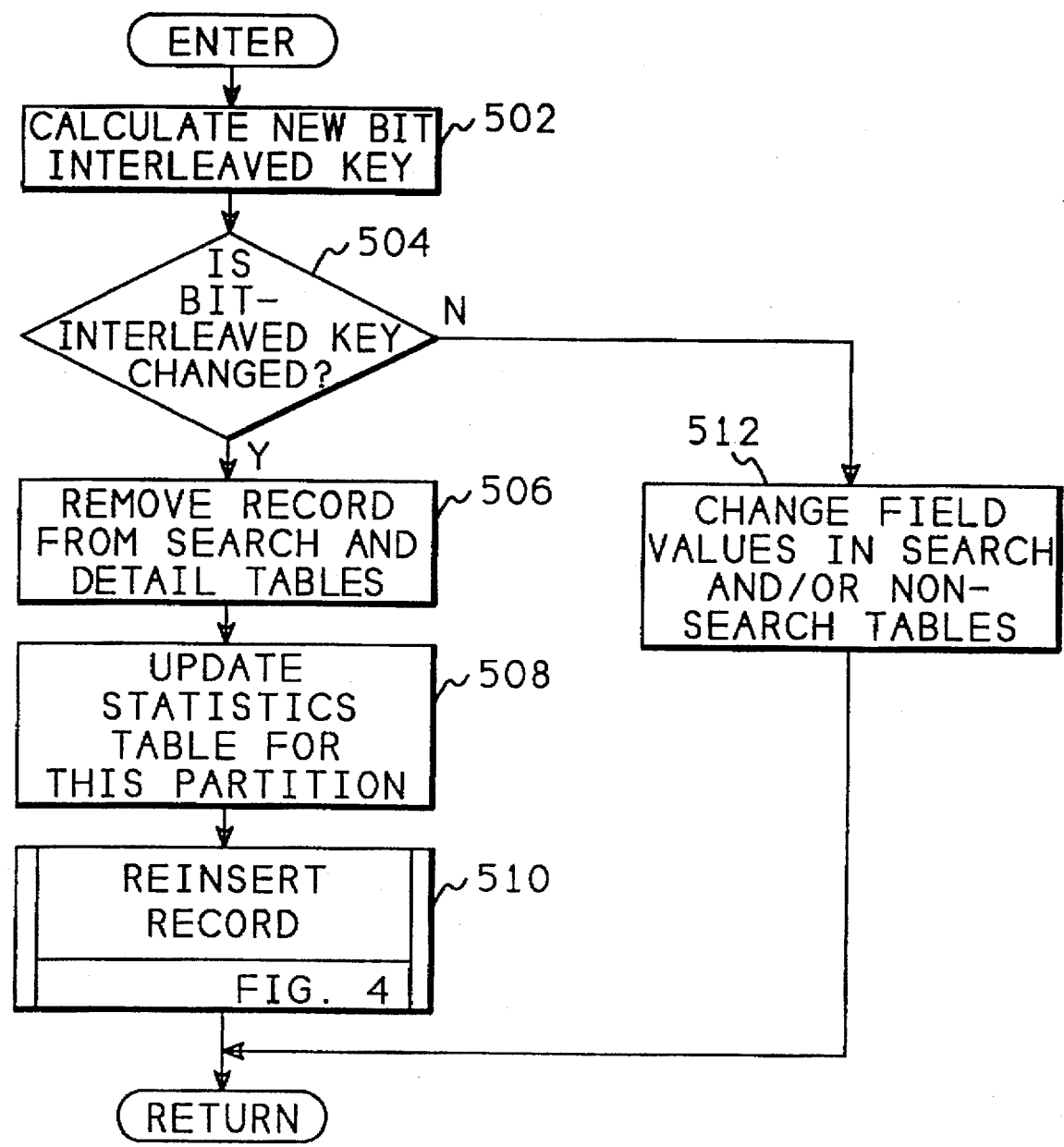
FIG. 5 shows a flowchart of the process of rewriting an existing record.

FIG. 5 shows a flowchart of the process of rewriting an existing record into the database. Referring to FIG. 5, after entry, block 502 builds the key and then block 504 determines whether the bit-interleaved key has changed. That is, have any values changed for the searchable fields that are part of the bit-interleaved key. If not, control goes to block 512 to change the field values and rewrite the record.

If the value of the bit-interleaved key has changed, control goes to block 506 which removes the record from the search and detail data tables. Block 508 updates the statistics record for the sub-table, and block 510 calls FIG. 4 to reinsert the new record before returning to the caller. As discussed above, the statistics table update could be done with a trigger function.

When reading records, the system performs query optimization, by decomposition and parallelization. The general method is:

```
For each partition listed in the statistics table
{
    Determine if this table is all in the result set, all out of the result set, or partially in
        and partially out
    If this partition cannot contain any records in the result set
    {
    skip this sub-table
    }
    Else
    {
        If all of the records in this partition are known to be inside the result set
        {
            If only a COUNT or other known statistic needed
            {
                Return the count/statistics from the statistics table
            }
            Else
            {
                Issue an asynchronous SELECT without the WHERE clause,
                to the sub-table in question, retrieving the values of all
                selected fields and the serial row key, from all rows
            }   }
        Else
        {
            Issue an asynchronous SELECT with the WHERE clause as received,
            to the search table in question, retrieving the values of all selected
            fields and the serial row key, from all qualifying rows
        }
        Use the list of serial keys to retrieve any fields from the detail table which are
            needed for the SELECT statement
}   }
Merge the results from individual partitions
Sort results if necessary.
```

Merges will have two categories: summation/averaging etc., and list unions. The list unions are done explicitly.

Figure 6:
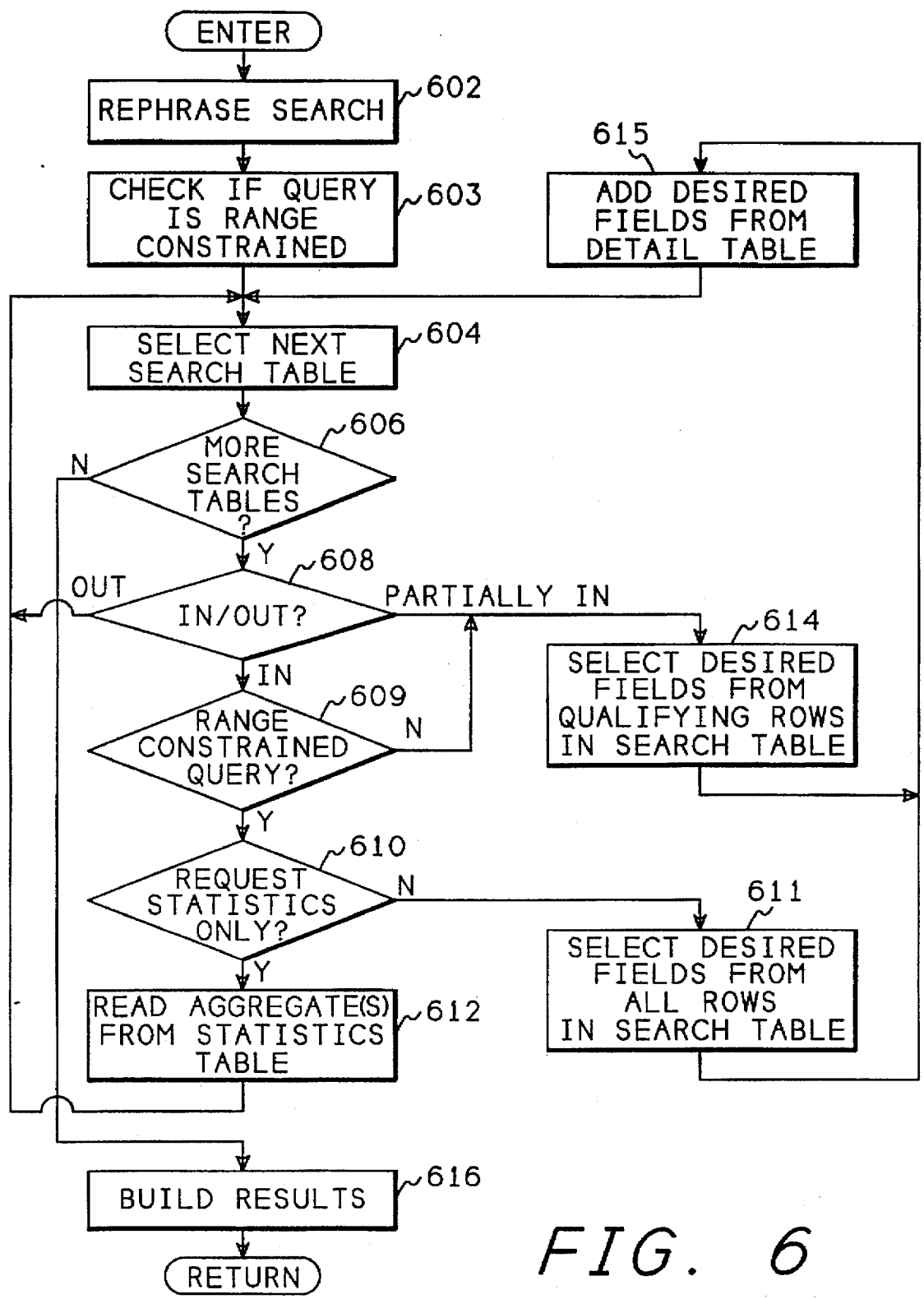
FIG. 6 shows a flowchart of the read record process of the invention.

FIG. 6 shows a flowchart of the process of solving a query against the database using the present invention. Referring now to FIG. 6, after entry, block 602 rephrases the query by converting all tests for set-inclusion ("WHERE field IN") and equality into range searches which minimally bound the desired result set. Specifically, it builds a data structure describing the query as a series of comparison conditions on ranges of fields. This is accomplished by doing the following:

Convert "IN lists" to the narrowest ranges which contain the desired values. For example, "WHERE value IN (2,6,8,29)" becomes "WHERE value>=2 and values <=29".

Convert equalities to 0-length ranges. For example, "value=3" becomes "value >=3 AND value<=3".

Block 603 checks to determine if the query is exactly specified using the set of ranges just created for this to be true, all of the following conditions must be met:

All constraints in the query must be fields which are in the bit-interleave key, and For each constraint field, all of its bits are in the bit-interleave key, and No "in" lists containing non-integer values existed in the query, and No "in" lists of integers which had gaps were converted to ranges, for example, "WHERE integer_value IN (3,4,5)" can be converted to "WHERE integer_value>=3 AND value<=5" without loss of exactness. However, "WHERE integer_value IN (3,4,7)" loses exactness when converted to "WHERE integer_value>=3 AND integer_value<=7".

If all four of these tests are true, block 603 sets the condition known as a "range constrained query", i.e. the query is completely specified with the use of the set of orthogonal ranges just constructed for range constrained queries, it is not possible for a record to meet these range constraints and not satisfy the originally requested selection criteria.

Block 604 selects the first or next partition whose search table is to be considered. Block 606 determines if all sub-tables have been considered, and if so, control transfers to block 616 where output results are merged and, if necessary, sorted.

The processing for each block begins with block 608, which determines whether this partition is completely in the result set, completely out of the result set, or partially in and partially out. If this partition is completely out of the result set, block 608 transfers back to block 604 to process the next partition.

If this partition is completely within the result set, that is, all the records stored in this partition satisfy the range constraints, then block 609 checks if this is a range constrained query as determined at block 603. This ensures that all records satisfying the range constraints also satisfy the user's query, which means that all records in this partition also meet the user's query.

If the query is range-constrained, control goes to block 610 which determines whether data other than statistical data is needed. If only aggregate values are needed, block 612 reads them from the statistics table, which is now known to be correct for this query, and returns to block 604 to process the next partition.

If data other than statistics have been requested, control proceeds to block 611, which selects the desired fields from all records in the search table. Block 615 then adds on the desired fields from the detail table, by joining with the serial key of the records in the search table. Control then returns to block 604 to select the next partition for processing.

In the case that not all records are in the result set, or that this is not a range-constrained query, block 608 or block 609 transfers control to block 614, since it is not known what subset of the records in the search table will meet the criteria. Block 614 explicitly selects only those records within the search table that meet the input selection criteria. Again, block 615 adds the desired fields from the detail table, and control goes to block 604 to select the next partition for processing.

Some of the characteristics of the final system are: the clustered partitioning software will scan the search sub-tables to get the desired results where possible; the number of sub-tables will be high, possibly thousands; each sub-table will be limited in size; since the textual portion of the data will not be in the search sub-tables, non-detailed extractions will have to read only a portion of the actual data; the sub-table scans parallelize extremely well; search time will be linear up to N, where N is the minimum of the number of processors, the number of disc spindles, and the aggregate input bandwidth limit; the fraction of data scanned will be the same order as the result set size in most cases; there will be no joins to do in those cases wherein the result set can be well described with ranges rather than set intersections; in the case where detailed results are needed, the system will join the search table to the detail table; insertions will be quite fast since there will be one index to update (in the detail table), and two insertions to perform, one for the text info in the detail table, and one for the search table. The unique keys can be generated outside the database safely. Keeping the statistics up to date can be done as a triggered update, increasing the number of writes to four, or it can be done in batch after a series of updates. This would take one full scan of each modified sub-table. The batch update option is considered much more efficient, and well suited to the decision support applications that are seen as the main uses of the present invention.

Performance improvements can be estimated by considering the case of a database with uniformly distributed data. This is rarely true, but it is a useful approximation. If a commercial database can handle about 8000 tables efficiently, then 13 bits will be needed in the bit-interleave key to allow for enough data splittings on uniformly distributed data, since 2 to the 13th power is just over 4000. In practice, there will be irregularities in the data, so the bit-interleave key should contain at least 50% more bits than the minimum necessary to represent the selected maximum number of tables. This means that for every query clause which restricts the solution set to 50% or less of the data, and whose field has its most significant bit in the first 13 bits, the system will halve the database scanning time. For example, in the above described example, if price <median, and age <30, and sex=male, and time >3-months-ago, the system will look at no more than 1/16 the total data. For each query clause that is more than 50% restrictive, for each factor of two restriction, up to the limit of the number of bits of that dimension in the first 13 bits of the interleave key, the system will halve the total amount of information scanned again.

As another example, if sex is the first bit of the interleaved key, income the second, and time the third, and if the amount of data has caused the scheme to split the data into 8 tables, then the males will be in the first 4 tables, the above-median income people will be in the 3rd, 4th, 7th, and 8th tables; and the most recent half of the data will be in the even numbered tables. No matter which of these criteria is used, any or all, the partitioning method will reduce the amount of information which must be scanned by at least one half.

Having thus described a presently preferred embodiment of the present invention, it will be understood by those skilled in the art that many changes in construction and circuitry and widely differing embodiments and applications of the invention will suggest themselves without departing from the scope of the present invention as defined in the claims. The disclosures and the description herein are intended to be illustrative and are not in any sense limiting of the invention, defined in scope by the following claims.

What is claimed is:

1. A method for storing and accessing records in a database table, the method comprising the steps of:
   (a) selecting at least two search fields from the input data table;
   (b) defining a bit-interleaved key field comprising
      (b1) for each field selected in step (a), determining a percentage of queries that will use the field,
      (b2) from the fields selected in step (a), selecting a field having the highest percentage of queries as defined in step (b),
      (b3) selecting a most significant bit from the field selected in step (b2),
      (b4) assigning the bit selected in step (b3) as a bit of the bit-interleave key field,
      (b5) reducing the percentage of queries for the field selected in step (b2) by a predetermined amount,
      (b6) repeating steps (b2) through (b5) until the bit-interleave key field has all bits assigned;
   (c) attaching a unique record identifier to each record in the input data table;
   (d) defining a search table within the database comprising
      (d1) building a key field as defined in step (b) for each record in the input data table, and
      (d2) combining the record identifier defined in step (c), the key field as built in step (d1), and the fields selected in step (a), for each record in the input data table and writing this combination to the search table;
   (e) defining a detail table within the database comprising
      (e1) combining the record identifier defined in step (c) and the remaining fields from each record in the input data table, and writing this combination to the detail table; and
   (f) receiving a search request comprising a set of value constraints and retrieving a set of all records satisfying the value constraints from the search table and detail table comprising
      (f1) determining whether at least one record in the search table may satisfy the set of value constraints,
      (f2) when step (f1) determines that at least one record may satisfy the set of value constraints, comparing the values of the fields in each record in the search table to the set of value constraints, and
      (f3) for each record selected in step (f2) using the record identifier to retrieve a corresponding record from the detail table.

2. The method of claim 1 further comprising the step of:
   (g) receiving a search request comprising a scalar aggregate function of values in the search table and detail data table comprising
      (g1) determining whether all records in the search table are known to match the scalar aggregate selection criteria,
      (g2) when all records are known to match the scalar aggregate selection criteria, returning a predetermined scalar aggregate value for the records, and
      (g3) when at least one record in the search table may not match the scalar aggregate selection criteria, examining each record in the detail table to determine the value of the scalar aggregate function.

3. The method of claim 1 wherein step (b4) further comprises defining the bit-interleave key field in most significant to least significant order.

4. The method of claim 1 wherein step (b5) further comprises reducing the percentage of queries for the field by half.

5. The method of claim 1 wherein fewer than all fields selected in step (a) are defined within the bit-interleaved key field in step (b).

6. The method of claim 1 wherein step (d) further comprises the following steps (d3) and (d4), and wherein step (f) further comprises the following steps (f1a) and (f2a):
   (d3) when the number of search records exceeds a first predetermined amount, splitting the search table into two sub-tables;
   (d4) when a sub-table as created in step (d3) exceeds the predetermined amount, splitting the sub-table into two additional sub-tables;
   (f1a) when the search table has been split into sub-tables, determining whether at least one record from each search sub-table may satisfy the set of value constraints; and
   (f2a) when the search table has been split into multiple search sub-tables, comparing the values of the fields in each record in each search sub-table to the set of value constraints, for only those search sub-tables determined to be candidates in step (f1a).

7. The method of claim 6 wherein splitting the search table or a sub-table comprises selecting records for a first sub-table having a first value in a most significant bit of the bit-interleaved key that varies within the sub-table, and selecting records for a second sub-table having a second value in the most significant bit of the bit-interleave key that varies within the sub-table.

8. The method of claim 6 wherein step (d) further comprises the following step (d5), and wherein step (f) further comprises the following step (f4):
   (d5) defining a statistics record for each sub-table, comprising the steps of
      (d5a) storing a minimum value for each field of the records of the search sub-table,
      (d5b) storing a maximum value for each field of the records of the search sub-table,
      (d5c) storing a minimum value for the key field within each record in the search sub-table,
      (d5d) storing the maximum value for the key field within each record in the search sub-table,
      (d5e) storing a sum value of each summable field of the search sub-table, and
      (d5f) storing a count of records in the search sub-table; and
   (f4) when data for a request comprises statistics, retuning the statistics from the statistics record.

9. The method of claim 6 wherein step (f1) further comprises:
   (f1a) performing the search of at least two sub-tables in parallel processes.

10. The method of claim 9 wherein the parallel processes are performed in separate interconnected processors.

11. The method of claim 1 wherein step (e) further comprises the steps of:
    (e2) when the number of detail records exceeds a second predetermined amount, splitting the search table into two detail sub-tables; and
    (e3) when one of the detail sub-tables created in step (d3) exceeds the predetermined amount, splitting the one detail sub-table into two additional detail sub-tables.

12. A method for storing and accessing records in a database table, the method comprising the steps of:
    (a) selecting at least two search fields from the input data table;

(b) defining a bit-interleaved key field comprising
   (b1) for each field selected in step (a), determining a percentage of queries that will use the field,
   (b2) from the fields selected in step (a), selecting a field having the highest percentage of queries as defined in step (b),
   (b3) selecting a most significant bit from the field selected in step (C2),
   (b4) assigning the bit selected in step (b3) as a least significant bit of the bit-interleave key field,
   (b5) reducing the percentage of queries for the field selected in step (b2) by half,
   (b6) repeating steps (b2) through (b5) until the bit-interleave key field has all bits assigned;
(c) attaching a unique record identifier to each record in the input data table;
(d) defining a search table within the database comprising
   (d1) building a key field as defined in step (b) for each record in the input data table, and
   (d2) combining the record identifier defined in step (c), the key field as built in step (d1), and the fields selected in step (a), for each record in the input data table and writing this combination to the search table;
(e) defining a detail table within the database comprising
   (e1) combining the record identifier defined in step (c) and the remaining fields from each record in the input data table, and writing this combination to the detail table;
(f) receiving a search request comprising a set of value constraints and retrieving a set of all records satisfying the value constraints from the search table and detail table comprising
   (f1) determining whether at least one record in the search table may satisfy the set of value constraints,
   (f2) when step (f1) determines that at least one record may satisfy the set of value constraints, comparing the values of the fields in each record in the search table to the set of value constraints, and
   (f3) for each record selected in step (f2) using the record identifier to retrieve a corresponding record from the detail table; and
(g) receiving a search request comprising a scalar aggregate function of values in the search table and detail data table comprising
   (g1) determining whether all records in the search table are known to match the scalar aggregate selection criteria,
   (g2) when all records are known to match the scalar aggregate selection criteria, returning a predetermined scalar aggregate value for the records, and
   (g3) when at least one record in the search table may not match the scalar aggregate selection criteria examining each record in the detail table to determine the value of the scalar aggregate function.

13. The method of claim 12 wherein fewer than all fields selected in step (a) are defined within the bit-interleaved key field in step (b).

14. The method of claim 12 wherein step (d) further comprises the following steps (d3) and (d4), and wherein step (f) further comprises the following steps (f1a) and (f2a):

(d3) when the number of search records exceeds a first predetermined amount, splitting the search table into two sub-tables;
   (d4) when a sub-table as created in step (d3) exceeds the predetermined amount, splitting the sub-table into two additional sub-tables;
   (f1a) when the search table has been split into sub-tables, determining whether at least one record from each search sub-table may satisfy the set of value constraints; and
   (f2a) when the search table has been split into multiple search sub-tables, comparing the values of the fields in each record in each search sub-table to the set of value constraints, for only those search sub-tables determined to be candidates in step (f1a).

15. The method of claim 14 wherein splitting the search table or a sub-table comprises selecting records for a first sub-table having a first value in a most significant bit of the bit-interleaved key that varies within the sub-table, and selecting records for a second sub-table having a second value in the most significant bit of the bit-interleave key that varies within the sub-table.

16. The method of claim 14 wherein step (d) further comprises the following step (d5), and wherein step (f) further comprises the following step (f4):

(d5) defining a statistics record for each sub-table, comprising the steps of
      (d5a) storing a minimum value for each field of the records of the search sub-table,
      (d5b) storing a maximum value for each field of the records of the search sub-table,
      (d5c) storing a minimum value for the key field within each record in the search sub-table,
      (d5d) storing the maximum value for the key field within each record in the search sub-table,
      (d5e) storing a sum value of each summable field of the search sub-table, and
      (d5f) storing a count of records in the search sub-table; and
   (f4) when data for a request comprises statistics, returning the statistics from the statistics record.

17. The method of claim 14 wherein step (f1) further comprises:

(f1a) performing the search of at least two sub-tables in parallel processes.

18. The method of claim 17 wherein the parallel processes are performed in separate interconnected processors.

19. The method of claim 12 wherein step (e) further comprises the steps of:

(e2) when the number of detail records exceeds a second predetermined amount, splitting the search table into two detail sub-tables; and
   (e3) when one of the detail sub-tables created in step (d3) exceeds the predetermined amount, splitting the one detail sub-table into two additional detail sub-tables.

* * * * *